UNITED STATES PATENT OFFICE.

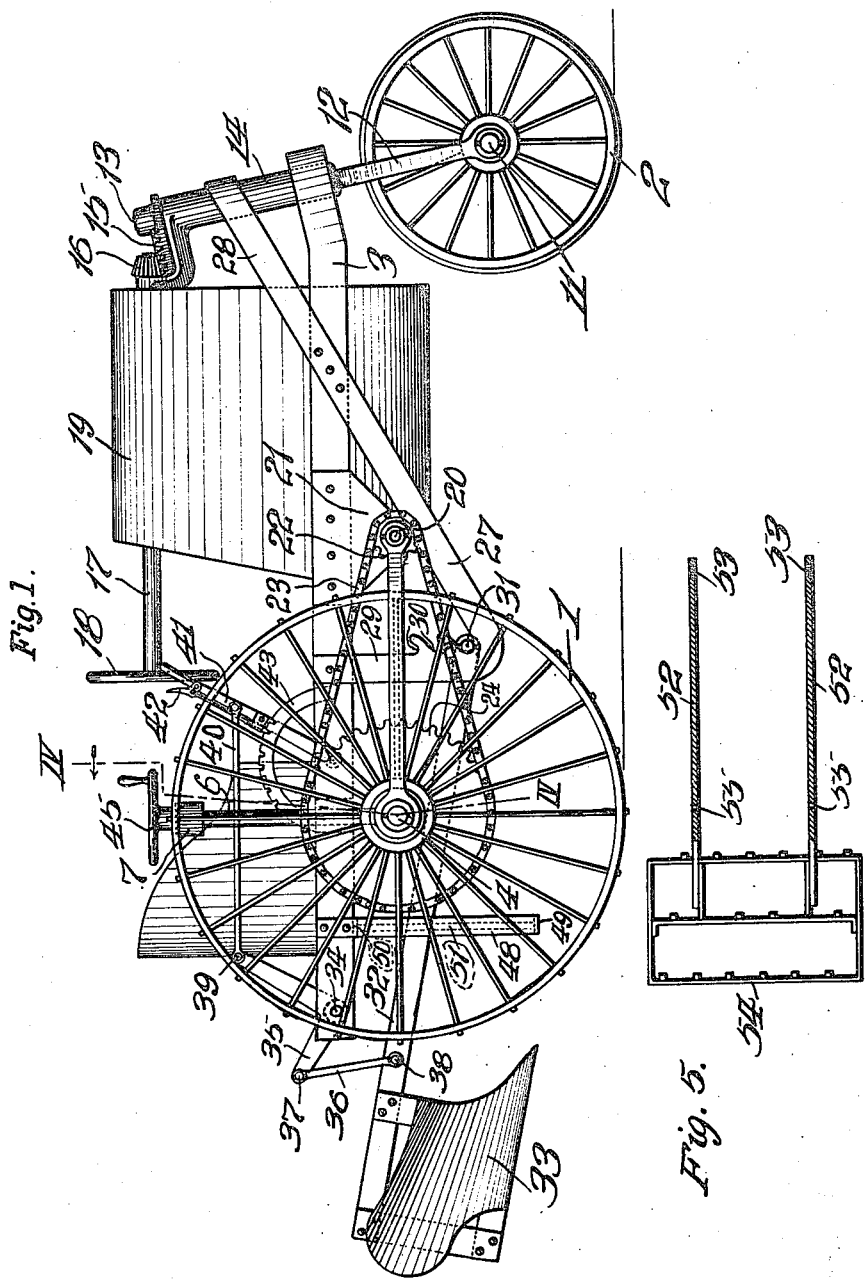

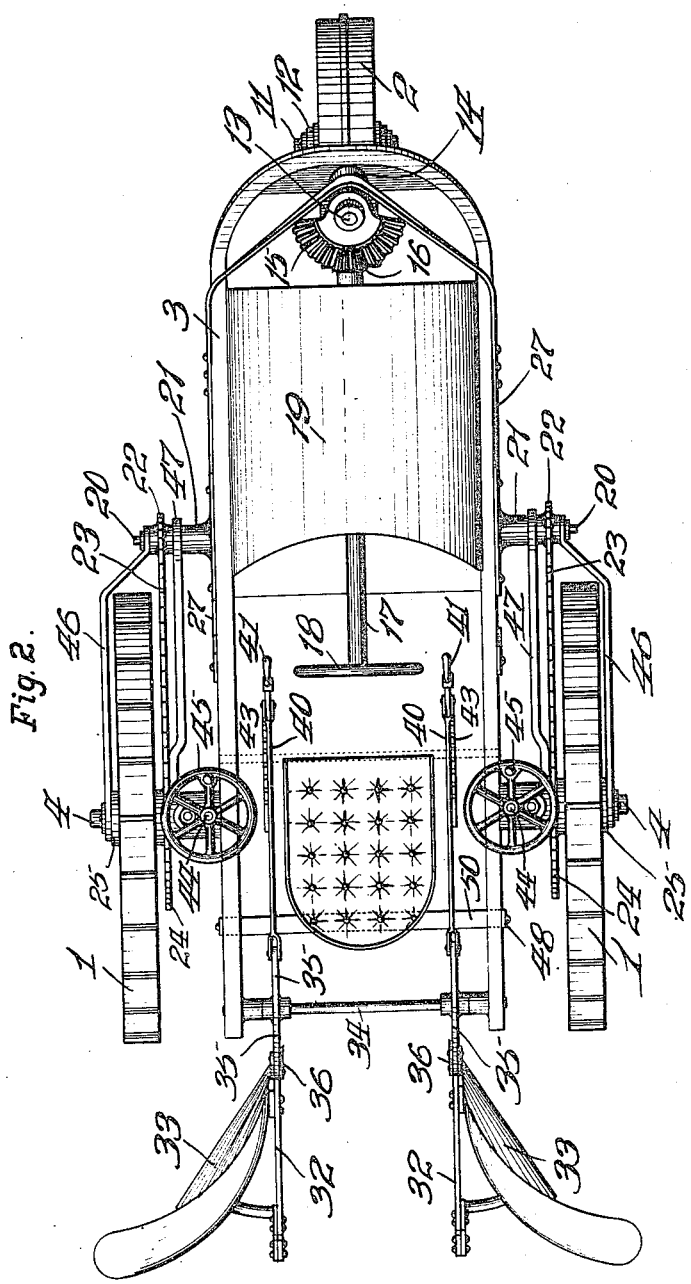

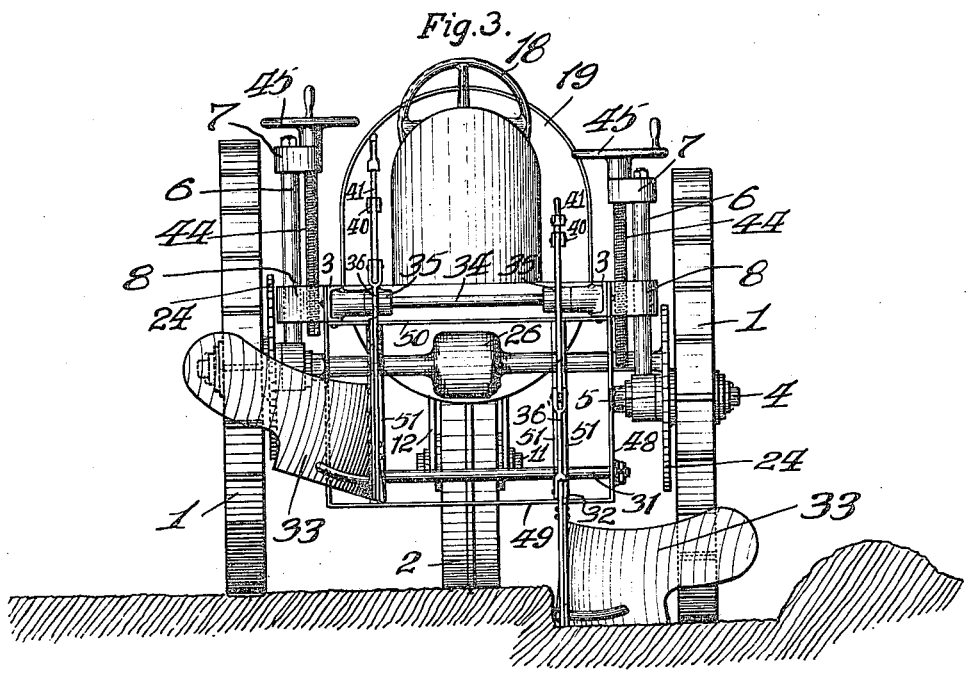
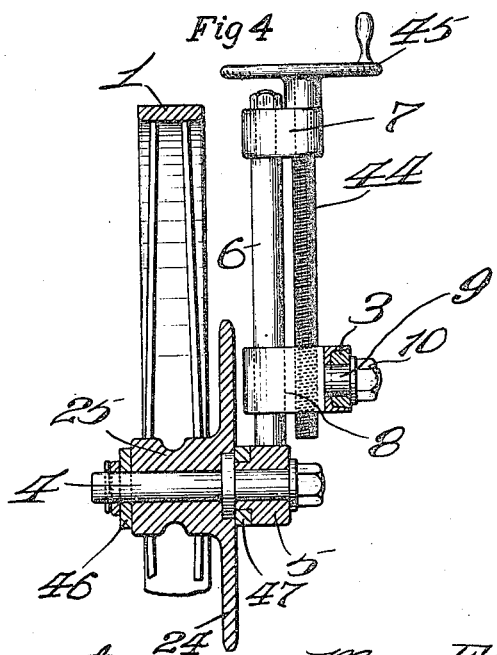

MAX EWALD BERGER, OF ST. LOUIS, MISSOURI.

AGRICULTURAL VEHICLE.

1,232,420.   Specification of Letters Patent.   Patented July 3, 1917.

Application filed May 26, 1913. Serial No 769,837.

*To all whom it may concern:*

Be it known that I, MAX EWALD BERGER, a subject of the German Emperor, residing in the city of St. Louis and State of Missouri, have invented certain new and useful Improvements in Agricultural Vehicles, of which the following is a specification.

The primary object of this invention is to provide a vehicle with improved means whereby different ground-working tools, such as a plow, harrow, or cultivator, may be readily and quickly applied thereto.

Another object is to provide an improved construction in a vehicle whereby a right-hand and a left-hand plow is carried thereby, said plows being adapted to be used alternately.

A further object is to provide improved means for lowering and raising the plows.

A still further object is to provide improved adjusting means to the tractor wheels so they can be adjusted independently of each other.

Other and further objects will appear in the specification, and be specifically pointed out in the appended claims, reference being had to the accompanying drawings exemplifying the invention, and in which, Figure 1 is a side elevation of this improved vehicle showing the plows attached thereto.

Fig. 2 is a plan view of Fig. 1.

Fig. 3 is a rear elevation of the vehicle.

Fig. 4 is an enlarged vertical section taken on the line IV—IV, Fig. 1.

Fig. 5 is a small plan view of a harrow which can be readily attached to the vehicle after the plows have been dismounted therefrom.

Referring to the drawings: this improved vehicle is preferably of the three-wheel type, comprising a pair of oppositely disposed tractor wheels 1 and a central front steering wheel 2; all of said wheels serving as a support to the vehicle frame 3. The tractor wheels 1 are each mounted on the spindles 4. Each of said spindles is secured to the shank 5 formed on the lower end of a vertical post 6, the top of said post 6 being firmly secured in the block 7. These vertical posts 6 are adapted to be slidably mounted in swivel blocks 8. Each swivel block is mounted on the outside of the vehicle frame 3, and has bearing portions 9, said blocks being secured to said vehicle frame by the nuts 10.

The front wheel 2 is mounted on a short shaft 11, said short shaft being secured adjacent the end of a yoke 12. Said yoke 12 is secured to the lower end of a steering post 13, which is turnably mounted in the elongated bearing 14. Said bearing is secured adjacent the front end of the frame 3, and at the center thereof. Mounted on the upper end of the steering post 13 is a segmental bevel gear 15 which meshes with the bevel gear 16 mounted on the end of a horizontal shaft 17. Said shaft 17 is operable by the hand wheel 18 mounted thereon.

This improved vehicle is preferably of the motor-driven type, there being a hood 19 located adjacent the front of the vehicle frame 3, for incasing the motor. Adapted to be operated by the motor (not shown) is a countershaft 20 which is located transversely of the vehicle frame and is supported in bearings 21. Mounted adjacent the ends of said countershaft 20 are sprocket wheels 22 carrying endless chains 23, each of said endless chains also being mounted on driving sprockets 24 formed on the hubs 25 of the tractor wheels 1. A differential gear is mounted on the countershaft 20 adjacent the center thereof, and is inclosed in a differential housing 26.

Secured to each side of the vehicle frame 3 is a framing 27 having a rearwardly inclined portion 28 and a vertical portion 29. Formed in each vertical portion 29 are a series of oppositely disposed notches 30. Adapted to be adjustably mounted in a pair of said oppositely disposed notches 30 is a transverse rod 31, which, as shown in Fig. 1, is mounted in the lowermost pair of notches. Loosely mounted on said rods 31, adjacent their forward ends, are a pair of draft beams 32. Each of said beams, adjacent their rear ends, has a plow 33 attached thereto.

Mounted transversely of the vehicle frame 3, adjacent its rear end, is a rock shaft 34 on which is mounted a pair of rocker arms 35. Each of said rocker arms is located in approximate vertical alinement with each beam 32. A connecting rod 36 connects each beam 32 to each rocker arm 35. Said rods are swingingly connected to the rocker arms by pivots 37 and to the beams by pivots 38. Connecting with the upper ends of each rocker arm 35, by pivots 39, is a connecting rod 40, said rods being connected at their forward end to hand levers 41, Said hand levers are pivotally connected at their lower ends to a portion of the vehicle, there being a locking and hand releasing member 42 carried by each handle 41, which are operable on a pair of quadrants 43 secured to a portion of the vehicle.

Mounted parallelly with each vertical port 6 is a spiral shaft 44, the upper end of each shaft finding a bearing in a block 7, the lower end of said shafts spirally engaging and passing through the swivel block 8. Mounted on the upper end of each shaft, adjacent the block 7 is a hand wheel 45. Connecting the ends of the spindles 4 with the ends of the countershaft 20, and located on the outside of the tractor wheels 1, are radius rods 46. Connecting said axle spindle 4 with the countershaft 20, and on the inside of the tractor wheels 1 and sprockets 22 are a pair of inner radius rods 47.

In this improved construction of vehicle for the drawing of ground-working tools, when power is applied to the tractor wheels 1, the vehicle is propelled and can be steered by manipulation of the handle 18 relative to the steering wheel 2. When the plows 33 are not in operation, they are carried above the ground, as shown in Fig. 1, which elevated position of the plows has been brought about by the pressing forward of the handles 41. When it is desired to put one of the plows in operation, say the right-hand one, when looking toward the rear of the vehicle, the right-hand lever 41 is thrown back, which movement will actuate its respective rocker arm 35 and lower the plow into ground engaging position.

After a furrow has been made, in order to have one of the plows 33 work on the land side of the ground adjacent the furrow, the tractor wheel 1, which is adjacent the plow, will be lowered relative to the opposite tractor wheel. This is done by manipulation of the hand wheel 45 which is located adjacent the wheel to be lowered, and the spiral shaft 44 is turned in a right-hand direction. The action of the spiral 44 on the swivel block 8 will lower the tractor wheel 1, or, in other words, raise the vehicle frame on that side until the vehicle frame is approximately level. Then the plow that is adjacent the furrow is lowered to the proper depth.

One great advantage of this improved type of vehicle carrying a pair of plows, one a right-hand and the other a left-hand, is that when a field has to be plowed the first furrow can be made adjacent one end of the field. When the vehicle has traveled across the field, the plow that was used in making the first furrow will be elevated and the vehicle turned around, and the other plow, say the left-hand one, will be engaged in the furrow just made, and the tractor wheel that then becomes the furrow wheel for the next stretch across the field will be adjusted to the depth of the furrow relative to the leveling of the vehicle frame. The left-hand furrow will turn the sod into the furrow that was previously made by the right-hand plow. Every time the vehicle comes to the end of a furrow, the right-and left-hand plows will be worked alternately. The tractor wheels, of course, will also have to be adjusted alternately.

This will save considerable time as either one of the plows will be in operative position most of the time, as the only time the plows will be ineffective for plowing will be while the vehicle is making the turn adjacent the end of the furrow just made. This will be quite an item in the saving of time over the manner of plowing in which plowing is started in the center of the field and the plowed furrows are thrown against and on both sides of the first furrow made. Or where two furrows are first made across a field at a distance from each other and the succeeding furrows are thrown against the first, as there is so much idle travel across the field after leaving the last furrow made in order to get to the opposite side of the field.

Depending from the side members of the vehicle frame 3, adjacent the rear thereof is an U-shaped member 48 having the lower horizontal portion 49. Secured to the under side of the frame 3, and extending transversely thereacross is a bar 50. Vertically mounted between said portion 49 and bar 50 are two pairs of guiding members 51. Each pair of guiding members 51 is adapted to guide and prevent lateral movement of draw beam 32. Attention is called to the radius rods 46 and 47 which are mounted on the spindles 4 and countershaft 20. These rods will insure the proper tension of each chain 23 relative to the adjustment of the tractor wheels 1.

If it is desired to remove the plows 33 from this improved vehicle, the transverse bar 31 is removed from the pair of notches 30 of the framing 27, and the draft bars 32 of the plows 33 are removed from said bar 31. Then, if it is desired to mount a harrow (such as shown in Fig. 5) to the vehicle, said harrow having secured thereto the draft bars 52, the transverse bar 31 is mounted in the openings 53 formed in the forward ends of the draft bars 52, said draft bars, of course, being first introduced in between the vertical guiding bars 51. Then the transverse bar 31 is secured in a pair of the notches 30 of the framing 27.

It is also readily seen how other implements can be used, such implements of course having a pair of draft bars that will be similarly mounted to the transverse bar 31. The harrow 54, or any other implement desired to be used will have a pair of openings 55 formed in the draft bars adjacent the rear end so that the pivotal connections 38 of the links 36 can be engaged in the openings 55 so that the harrow, or other implement, can be elevated when not in operative position.

What I claim is:

1. In a vehicle, a frame, a pair of adjustably mounted tractor wheels, each of said wheels being mounted to a vertically arranged post, each of said posts being slidably mounted to said frame, and a spiral shaft paralleling each of said posts for moving said posts relative to said frame.

2. In a vehicle, a frame, a pair of adjustably mounted tractor wheels, each of said wheels being mounted to a vertically arranged post, each of said posts being slidably mounted to said frame, a threaded block slidingly secured to each of said posts, and a spiral shaft in engagement with each of said blocks, said shafts, when actuated adapted to adjust said wheels relative to the position of said frame.

3. In a vehicle, a frame, a pair of adjustably mounted tractor wheels, each of said wheels being mounted on a spindle, each of said spindles being secured to a slidingly arranged post, said posts being slidably mounted to said frame, and a spiral shaft adapted to actuate each of said posts to lower or raise said wheels relative to said frame.

4. In a vehicle, a frame, a pair of blocks pivotally mounted to said frame, a post slidably mounted in each of said blocks, a tractor wheel carried by each of said posts, a spiral shaft carried by each of said posts, said shafts being in engagement with said blocks, said posts and said shafts providing means for vertically adjusting said wheels relative to said frame.

5. In a vehicle, a frame, a pair of blocks pivotally mounted to said frame, a post slidably mounted in each of said blocks, a spindle carried by each of said posts, a tractor wheel mounted on each of said spindles, a spiral shaft carried by each of said posts, said shafts being in engagement with said blocks, said posts and said shafts providing means for vertically adjusting said wheels relative to said frame, and a pair of tension rods mounted on each of said spindles, each of said tension rods straddling each of said wheels.

MAX EWALD BERGER.

In the presence of—
M. C. HAMMON,
H. G. FLETCHER.